US006490502B2

(12) United States Patent
Fellows et al.

(10) Patent No.: US 6,490,502 B2
(45) Date of Patent: Dec. 3, 2002

(54) ARTICLE DISPENSING SYSTEM

(76) Inventors: Eugene E. Fellows, 322 Dulmer Dr., Nokomis, FL (US) 34275; Lawrence C. Hardy, Hardytown Rd. R.D. 1 Box 95, Cresco, PA (US) 18326

( * ) Notice: Subject to any disclaimer, the term of this patent is extended or adjusted under 35 U.S.C. 154(b) by 108 days.

(21) Appl. No.: 09/773,025

(22) Filed: Jan. 31, 2001

(65) Prior Publication Data

US 2002/0103573 A1 Aug. 1, 2002

(51) Int. Cl.[7] ......................... G06F 17/00; B65G 59/00; B65H 1/00; G07F 11/00

(52) U.S. Cl. ....................... 700/231; 700/242; 700/243; 221/119; 221/120

(58) Field of Search ................................ 700/231, 242, 700/243; 221/92, 113, 119, 120

(56) References Cited

U.S. PATENT DOCUMENTS 4,519,522 A * 5/1985 McElwee .................... 700/243
5,337,920 A * 8/1994 Clausen ...................... 700/243
5,957,372 A * 9/1999 Dean et al. ................. 700/231
5,971,594 A * 10/1999 Sahai et al. ................. 700/242
6,029,851 A * 2/2000 Jenkins et al. .............. 700/231

* cited by examiner

*Primary Examiner*—Christopher P. Ellis
*Assistant Examiner*—Gene O. Crawford
(74) *Attorney, Agent, or Firm*—Arthur W. Fisher, III

(57) ABSTRACT

An article or product dispensing system to selectively dispense products having a dispensing module including a carousel to store the plurality of products rotatable by a carousel positioning device between a dispensing station and a rejecting station to selectively position the carousel relative thereto. A product ejector selectively ejects product at the dispensing station and a product rejector selectively ejects product at the rejecting station. A product detector verifies the product at the dispensing station is the selected product. A control system including a product input to select the product to be dispensed is operatively coupled to the carousel positioning device, the product ejector and the product rejector, such that the carousel positioning device rotates the carousel to position the selected product at the dispensing station and the product ejector ejects the selected product when the product is detected. The carousel positioning device rotates the carousel to position the product at the rejecting station when product other than the selected product is detected at the dispensing station and the product rejector ejects product at the rejecting station.

22 Claims, 7 Drawing Sheets

ARTICLE DISPENSING SYSTEM

BACKGROUND OF THE INVENTION

1. Field of the Invention

An article or product dispensing system to selectively dispense a predetermined regimen of articles to a tray or other suitable container.

2. Description of Prior Art

Hospitals, clinics, nursing homes, and the like typically must dispense multiple medications to multiple patients on ever-changing schedules. Insuring that the right patient receives the right amount of the right medication at the right time presents significant logistical problems to the personnel responsible for prescribing, dispensing, and administering the medications. Even when everything in the system works properly, the logistics and paperwork required to dispense all medications to a group of patients correctly can be very time-consuming, labor-intensive, and expensive.

Unfortunately, it is not uncommon for medications to be administered to the wrong patient, or to the right patient in the wrong amount or at the wrong time. Such mistakes can arise in many ways. A patient may be misidentified, or moved to a different bed. Busy nurses may neglect to cross-check patient identification numbers in all cases. The cups containing different patients' medications may inadvertently be switched. The potentially harmful consequences of incorrectly dispensing medications to patients requires no elaboration.

U.S. Pat. No. 5,277,330 relates to a rotary magazine distributor apparatus comprising a plurality of vertical channels containing piles of respective different articles arranged in order to dispense articles selected by a buyer. The rotary magazine is provided with a power driving system. A powered distribution mechanism occupies a stationary location under the magazine and comprises an ejection finger intended to push horizontally the lower article of the pile. A side casing contains an electronic unit which controls all the distribution functions on the basis of information received from a selection keyboard and from stationary detectors indicating the position of the magazine, the identity of the channels and the presence of articles in the channels.

U.S. Pat. No. 3,871,156 describes a medicament dispensing system having a plurality of medicament pellet containing bowls mounted on a rotatable member in a helical array. A control system rotates the array to bring a selected bowl to a packaging station. At the packaging station, a varying magnetic field vibrates the selected bowl effecting movement of the selected number of pellets, one at a time, through a bowl outlet and into a packaging cup. Patient and medicament data is printed on a label that also serves as a package cover for the cup. The package of pellets is then dispensed from the system for use. An electronic control system for automatically dispensing the desired kind and number of pellets and for printing the desired patient information on the label is also provided.

U.S. Pat. No. 4,480,062 shows a vacuum operated system for individually dispensing items of oral solid medicine from bulk storage to a user where the medicine is dispensed under computer control and the quantity and type of medicine is selected in advance by the user. The invention includes medicine dispensing equipment and a computer that provides a user interface. A plurality of storage containers arranged in a rotatable carousel or a rectilinear array may contain various pharmaceutical articles, or various types, dosages, ages, and lot numbers of medicines. The storage containers may be easily refilled by inserting modular refill cartridges into the storage containers. After a user enters certain data into the computer, the invention aligns a universal vacuum probe with the storage container that contains the desired items. The universal vacuum probe is lowered to the desired storage container and engaged with a container probe that is exclusive to that storage container. After a vacuum source creates suction within the universal vacuum probe and the container probe, the universal vacuum probe and the container probe are operated to individually extract items from the storage container. In one embodiment, a user dispenses the extracted items into a cup for retrieval. In another embodiment, one or more items are packaged separately in an envelope, which is stored in a portable envelope-organizing tote along with other envelopes containing items requested by that user.

U.S. Pat. No. 5,562,232 discloses a semi-automated medication dispenser for dispensing multiple medications to multiple patients in the correct dosages at the correct times. Patient information and physician orders are entered into the computer's memory. A pharmacist loads medications needed by all the patients in a ward into individual compartments. After the medications are loaded into the dispenser, the computer controls access to the individual compartments. When a proper password is entered-such as the dispensing nurse-followed by identifying information for a particular patient, the computer allows access to only those compartments containing medications that are appropriate for the individual patient at that time. In many cases, the computer controls the dosage of the medication being dispensed as well, by controlling the number of pills dispensed. Thus, each patient receives all appropriate medications, and only the appropriate medications. The computer also simultaneously makes a record of the medications administered to each patient.

U.S. Pat. No. 5,713,485 comprises an automated drug dispensing system including a cabinet to store a variety of prepackaged pharmaceuticals in a plurality of bins for filling prescriptions. Each bin stores a particular variety of packaged multiple-dose pharmaceutical. Each variety of pharmaceutical is associated with a particular code. A controller receives request signals and in response generates dispense signals. Each bin includes a dispenser coupled to the controller for dispensing the package pharmaceuticals therefrom in response to a dispense signal sent from a controller. After a package is dispensed, a code reader determines the code of the dispensed package and verifies whether the code on the dispensed package matches the code of the requested package.

U.S. Pat. No. 5,850,344 shows a medication dispensing and timing system includes a central monitoring computer which generates and sends an address-specific medication prompting message in accordance with a prescribed medication dispensing schedule over a two-way paging system to a communicator carried by a patient. The communicator includes receiver circuitry which responds to the prompt message to generate a display and audible alarm to alert a patient. Upon the patient acknowledging the message by actuating a switch on the communicator transmitter circuitry within a predetermined time period following the dispensing event, the computer initiates an alternative communication procedure which includes telephone calls to the patient, his doctor, his care provider, or an emergency contact. The communicator may be equipped to electrically communicate with medication dispensing apparatus whereby the apparatus dispenses medication in response to a received prompting message. The dispensing apparatus may include a modem for communicating with the central monitoring computer to confirm actual dispensing, and to provide a control path whereby the dispensing apparatus can be controlled from the monitoring computer in the event of a radio link failure.

U.S. Pat. No. 5,971,594 comprises of a medication dispensing system-comprising medication dispensing unit and a central monitoring facility. The medication dispensing unit holds medication in a plurality of canisters selected according to an entered and stored prescription regimen and then notifies the patient by an audible or other sensory signal. If the patient presses a button within as prescribed time, the unit dispenses the selected canisters. If the patient does not press the button within the prescribed time, or if the unit detects a failure to dispense the selected canister, the unit makes the canister inaccessible and contacts a predetermined list of caregivers and then a central monitoring facility.

U.S. Pat. No. 3,656,636 describes a system and apparatus for automatically collecting, sorting, and distributing articles from one or more locations to one or more locations wherein a conveyor system gathers selected articles located at supply stations and automatically transports these articles to delivery stations. The conveyor system incorporates main and sidetracks with continuously driven carriers moving along the tracks. Article supply and delivery stations are associated with respective side tracks and the carriers are selectively routed onto the side tracks with system-controlled track switches, the data for controlling the switches, the data for controlling the switches is advantageously shown as being transmitted by the respective carriers themselves. A drive mechanism in the form of a continuous chain is coupled to the carriers by means of a drive link which is pivotably coupled from the drive chain to the carriers with the orientation of the link relative to the drive chain being controlled for speed control of the carriers at the respective article handling system. Meshing engagement of article carriers with the article supply and delivery stations assures a rapid article handling system. Various system configurations are disclosed.

U.S. Pat. No. 5,761,877 discloses an automated system for individual dosage medication distribution. The system includes a medium rate dispenser, a fast rate dispenser, a low rate dispenser, a conveyor, a diverter, a bagger, and collection bins. The dispensers are arranged to be able to deliver individual dosage packages of drugs to the conveyor. The conveyor, in turn, is configured to transport individual dosage packages to the bagger or the collection bin. A programmable controller receives patient prescription order information from health care providers and directs the dispensers, conveyor, diverter, and bagger to automatically pick the prescribed medication dosage unit, place it in a transportable package, and label the package for the health care personnel.

U.S. Pat. No. 5,401,059 relates to a process and apparatus for pairing drugs corresponding to a prescribed treatment with a given patient including marking of arm bands or other identification devices with the patients' identification data, permanently attaching the identification device to the patient, retrieving a drug corresponding to the prescribed treatment and verifying its agreement with the drug administration data stored on the identification device, introducing the drug into a container which is previously marked with the patient information data and drug administration data and closing the container. The process further includes moving the container to a drug delivery station at the patient location and verifying agreement of the data marked on the container with that stored on the identification device of the patient. Subsequently, the container is opened and agreement between the patient identification data marked on the identification device and the drug administration data marked on the container are verified with the drug subsequently being administered upon verification of the agreement.

U.S. Pat. No. 5,564,593 teaches an apparatus for dispensing a combination of medications in dose lots at timed intervals comprising a housing; a plurality of dose modules; rotatably mounted in the housing, each dose module including at least one circular disc, each of the discs having a plurality of apertures therethrough, wherein each aperture is sealed on either side with film so as to form a compartment which contains a single dose of a medication; extractor means mounted to the housing for selectively piercing the film coveting the apertures so as to release the medication contained in respective apertures; signaling means mounted to the exterior of the housing for periodically indicating a time medication is to be taken; and dose module index means for indexing each dose module at a predetermined interval and for actuating the signaling means. In an alternative embodiment, the dispenser is controlled by a microprocessor system.

U.S. Pat. No. 5,660,305 describes an automatic prescription dispensing system, including a multiplicity of pill dispensers dispensing the pills of different prescriptions arranged in columns and rows. A conveyor organizes open and labeled pill bottles severally past and beneath the pill dispensers in the array. The pill bottles are carried in bottle carriers, which in turn are carried by pallets on a conveyor. When a pill bottle gets to a pill dispenser containing the pills to be dispensed for the prescription of a pill bottle, the pills are released from the dispenser into the pill bottle, whereby a plurality of pill bottles passing under the array of dispensers are filled simultaneously. The pill dispensers count the pills out one at a time and accumulate the pills of a prescription before the pill bottle to receive such prescription reaches the dispenser and then releases the pill en masse into the pill bottle.

U.S. Pat. No. 5,713,487 shows a system for dispensing medicaments such as pills and capsules includes a plurality of medicament dispensing cells, a manipulator arm for moving to a cell and receiving medicament dispensed therefrom into a vial, and a controller for controlling the operation of the manipulator arm. In one embodiment of the invention, each cell includes indicia thereon such as a bar code indicating the medicament contained therein and the system includes an indicia reader such as a bar code reader attached to the manipulator arm. When the system receives dispensing instructions such as a prescription to be filled, the controller moves the manipulator arm to a selected cell location of a cell having the medicament to be dispensed, as indicated by cell data included in the controller memory. The indicia reader reads the indicia on the cell at the selected location and the controller determines whether the medicament indicated by the indicia matches the medicament of the prescription. If there is a match, the medicament is deemed verified and dispensing proceeds. If there is no match, the controller prevents dispensing of medicament from the selected cell.

U.S. Pat. No. 5,152,422 comprises a dispenser for dispensing predetermined pills in sequential order including a base with a cylindrical housing removably mounted on the base and pill container dispenser opening in the cylindrical housing. A pill container magazine is rotatably mounted inside the cylindrical housing and has a plurality of magazine sections thereon for holdings a plurality of vertically stacked pill containers in stacked arrays. The pill container magazine in a manual embodiment has a plurality of shift knobs thereon for rotatably shifting the pill container magazine within the cylindrical housing between dispensing positions. A visual and audible signal system is mounted in the dispenser base and is actuated by a timer or clock mechanism to signal the time for a patient to take the pills in one pill container in the pill container magazine. A motorized unit has a standard commercial timer mounted beneath the rotatable magazine and has a mechanism for shifting the magazine between positions as the timer mechanism rotates to thereby automatically rotate and align the magazine with the appropriate pill container and set off the visual and audio alarm reminder.

U.S. Pat. No. 5,755,357 teaches multiple medication dispensing carousels to selectively dispense medication. The traveling actuator carries a tray that receives the dispensed medication. The tray flips to discharge the medication for patient use. The single actuator simplifies operation and reduces drop distance, thereby leading to a compact, low profile assembly.

WO 87/00948 relates a machine for automatic rental of videocassettes. Cassettes are stored in a drum like magazine and are made available at a dispensing slot after a user has identified himself by introducing a personal into a slot and entered a unique personal code number on a keyboard which the user also employs to enter the selection from the available video cassettes. On returning the cassette, the user again identifies himself and the machine verifies by reading a bar code that the hired film has been returned.

Additional examples of the prior art are found in JP 404095192-A and JP 3-25696.

SUMMARY OF THE INVENTION

The present invention relates to an apparatus to selectively dispense articles or products selected from a plurality of products comprising a product dispensing system to store and dispense product therefrom, a tray/tote transport system to transport trays/totes to the product dispensing system to receive product dispensed therefrom and a control system to control the operation of the product dispensing system.

The product dispensing system comprises a dispensing module including a carousel having a plurality of product compartments to store stacks of product therein. The product dispensing system is selectively rotatable between a product dispensing station, a product rejecting station and a product stocking station by a carousel positioning device having a carousel position detector to determine the rotational position of the carousel relative to the dispensing station, the rejecting station or the stocking station. A product detector and a product ejector are disposed at the dispensing station to selectively eject the selected product at the dispensing station into a tray or tote. A product rejector is disposed at the rejecting station to selectively eject product at the rejecting station into a reject bin.

The tray/tote transport system moves trays or totes from a tray/tote loading station to the dispensing station to be filled with selected product from the carousel and then to a take-off or fulfillment station.

The control system comprises a product request system to order a discrete inventory of products associated with a specific identifiable request, a transport/request control system to supply discrete trays or totes to the dispensing system to be filled with the corresponding requested inventory of products and a dispensing system control to control the operation of the product dispensing system in filling the designated tray or tote with the discrete inventory of products associated therewith.

When operating in the dispensing mode, a tray/tote is transported from the tray/tote loading station to the dispensing station as the carousel rotates the appropriate product stack in the corresponding product compartment to the dispensing position. When both the tote and the stack are in position, the product is scanned by the product detector and when confirmed by the control system, is dispensed into the tray/tote by the product ejector. The scanning and dispensing continues until all of the requested products are dispensed into the tray/tote.

If the product detector detects an incorrect product in the product stack or compartment, the system control will rotate the product compartment containing the incorrect product to the rejecting station where the product rejector rejects the product into the bin and then returns to the appropriate product compartment with the correct stack of product to the dispensing station to complete the filling process.

If an empty product compartment is detected while in the dispensing mode, the product dispensing system will alert the operator who will prioritize the restocking of the correct product in the appropriate product compartment.

A tray/tote reject spur is located adjacent to the fulfillment or tray/tote unloading station. The product dispensing system will divert any trays or totes containing incomplete orders to the tray/tote reject spur and print a list of missing products to be supplied or completed by the system operator to fill the request.

When in the stocking or restocking mode, the operator can bring product to the location 180 degrees from the dispensing station. The operator will scan the product, and if the product is located within a product compartment on the carousel, the appropriate product compartment for that product will be rotated to the stocking station by the system control. Once the proper product compartment is so positioned, a stock/restock light or other indicator will be energized; the operator will place the product in the product compartment. Once the product is stocked or restocked, the operator will depress the "replenishment done" push button completing the process. The dispensing cycle will be completed and the stocking mode will begin. Upon completion of the stocking of the product stack, the product dispensing system returns automatically to the dispensing mode.

The invention accordingly comprises the features of construction, combination of elements, and arrangement of parts that will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
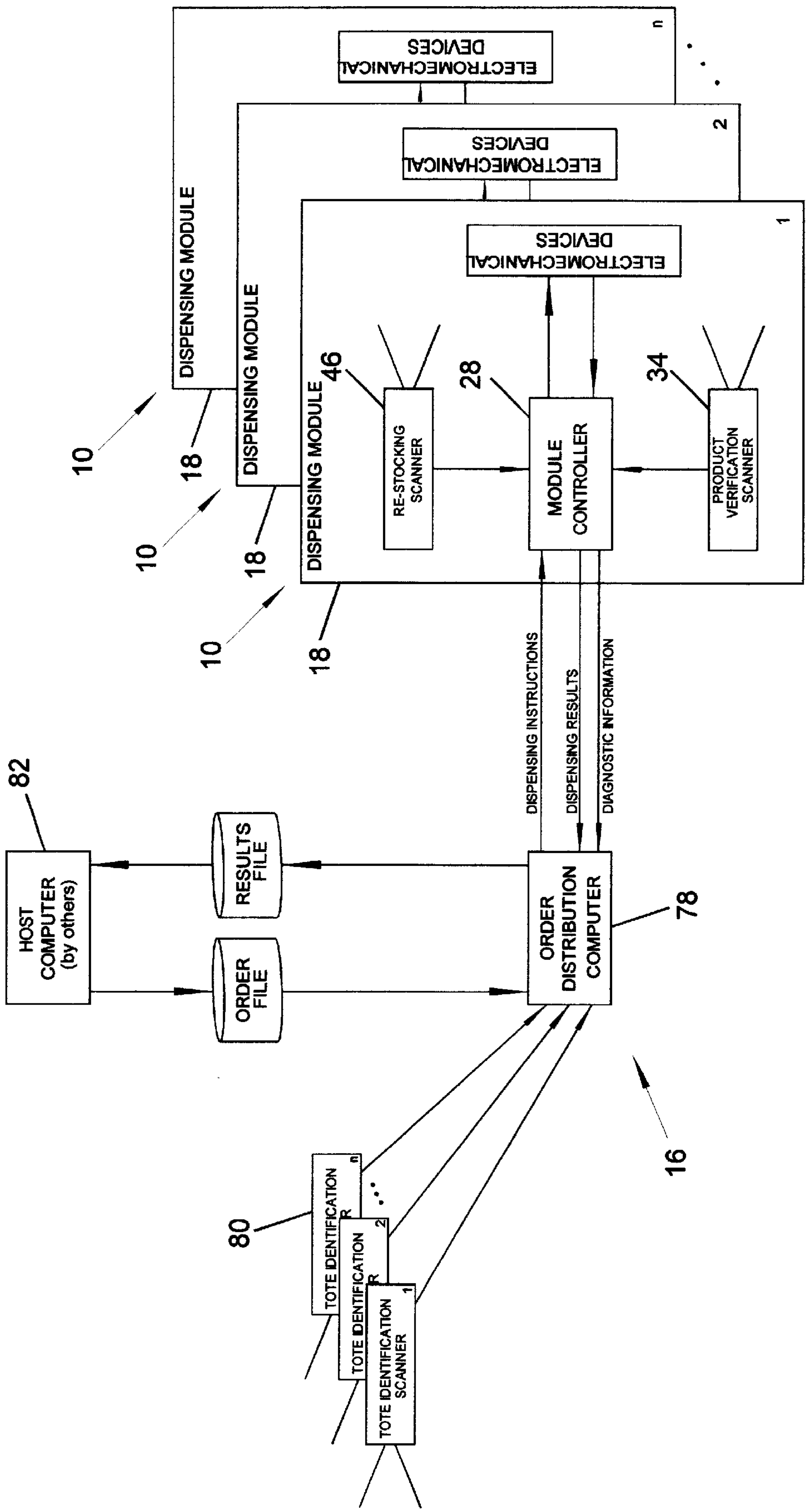
FIG. 1 is a functional block diagram of the apparatus of the present invention.
Figure 2:
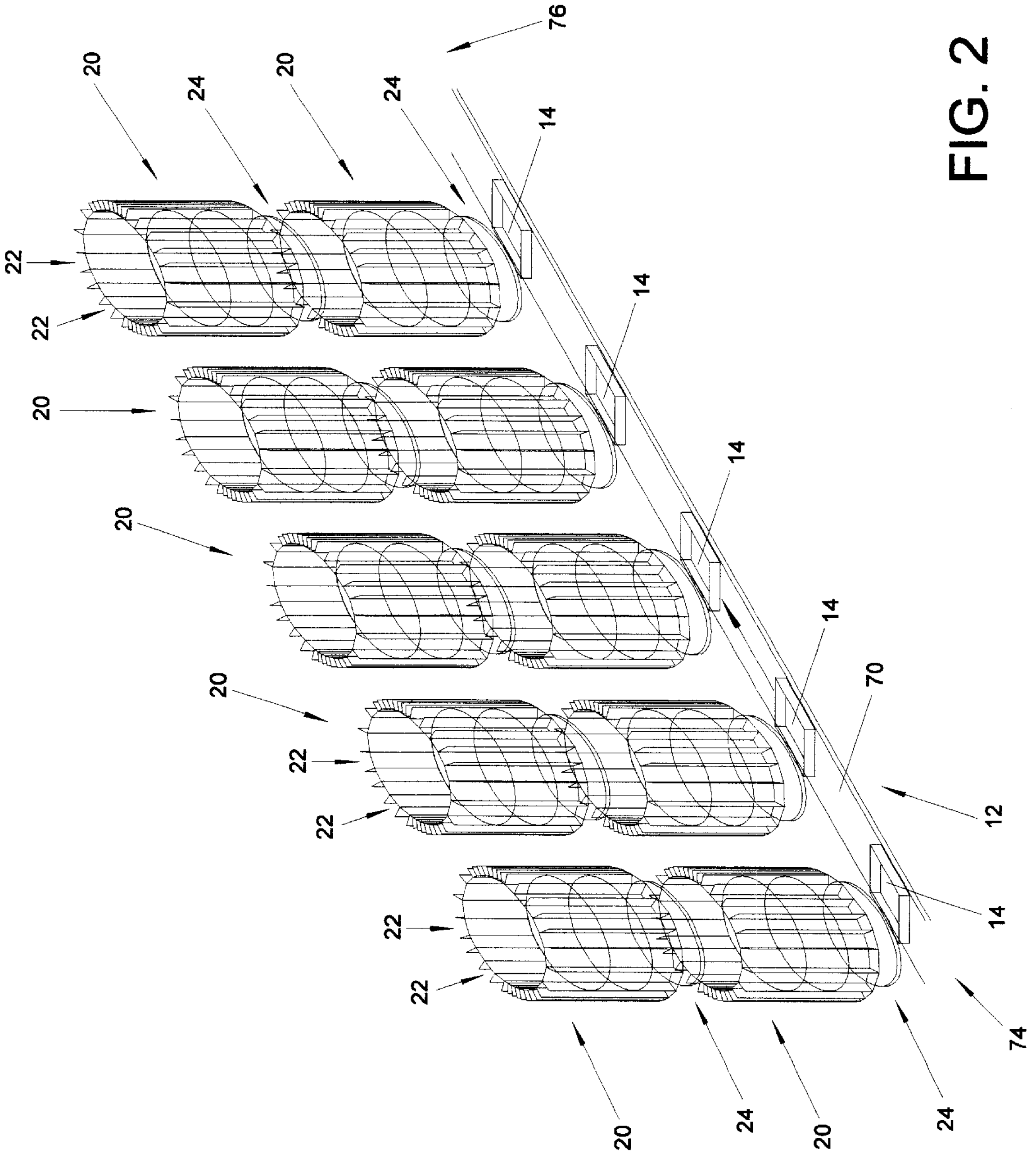
FIG. 2 is a partial perspective schematic view of the apparatus of the present invention.

The present invention relates to an apparatus to selectively dispense products selected from a plurality of products schematically depicted in FIGS. 1 and 2. Specifically, the apparatus comprises a product dispensing system generally indicated as 10 to store and dispense product therefrom, a tray/tote transport system generally indicated as 12 to transport trays/totes 14 to and from the product dispensing system 10 to receive product dispensed therefrom and a control system generally indicated as 16 to control the operation of the product dispensing system 10 and the tray/tote transport system 12 as described more fully hereinafter. The apparatus as depicted may comprise a plurality of product dispensing systems 10 disposed either vertically and/or horizontally relative to each other to increase the capacity and selection of products dispensed from the apparatus.

As shown in FIGS. 1 through 5, each product dispensing system 10 comprises a dispensing module generally indicated as 18 including a carousel generally indicated as 20 having a plurality of product compartments each generally indicated as 22 to store stacks of product therein rotatably mounted on a base generally indicated as 24, a carousel drive generally indicated as 26 to selectively rotate the carousel 20, a module controller 28 including logic to control the operation of the product dispensing system 10 and a carousel position sensor or shaft encoder 30 to sense or indicate the position of the carousel 20 relative to at least one of a plurality of predetermined carousel positions including a product dispensing station generally indicated as 32 having a product detector scanner or product verification device 34 to scan product disposed within the product compartment 22 positioned at the product dispensing station 32, a product ejector or divertor generally indicated as 36 to dispense product from the product compartment 22 positioned or located at the product dispensing station 32 when the product compartment 22 corresponds to product selected by the control system to be dispensed to the corresponding tray/tote 14 when the apparatus is operating in a dispensing mode and a product ejector or divertor sensor or product dispensed sensing device 38 such as a photo eye to sense product dispensed from the product compartment 22 by the product ejector or divertor 36, a product rejecting station generally indicated as 40 having a product rejector or divertor generally indicated as 42 to dispense product from the product compartment 22 positioned or located at the product rejecting station 40 when the product is within the product compartment 22 does not correspond to the product selected to be within the product compartment 22 when the apparatus is operating in the product rejecting mode and a product stocking/restocking station generally indicated as 44 having a product stocking/restocking scanner 46 to scan product to be placed or stacked into the product compartment 22 located or positioned at the stocking/restocking station 44 and a stocking/restocking indicator 48 such as a lamp or light to indicate the corresponding or correct product compartment 22 designated to contain the selected product to be stocked or restocked is positioned or located at the product stocking/restocking station 44. The stocking/restocking indicator 48 may also comprise a stock or restock switch or control to indicate that the selected product compartment 22 has been stocked or restocked when actuated. The product ejector or divertor 36 and the product rejector or divertor 42 each comprises an actuator 37 having a plunger or ejector member 39 moveable between a retracted and extended position operatively mounted thereto coupled to a corresponding solenoid valve 41 to selectively move the corresponding plunger or ejector 39 between the retracted and extended position when the dispensing module 18 is operating in the product dispensing mode or the product rejecting mode to eject or reject product from the product compartment 22 located at the product dispensing state 32 or the product rejecting station 40 respectively.

Figure 4:
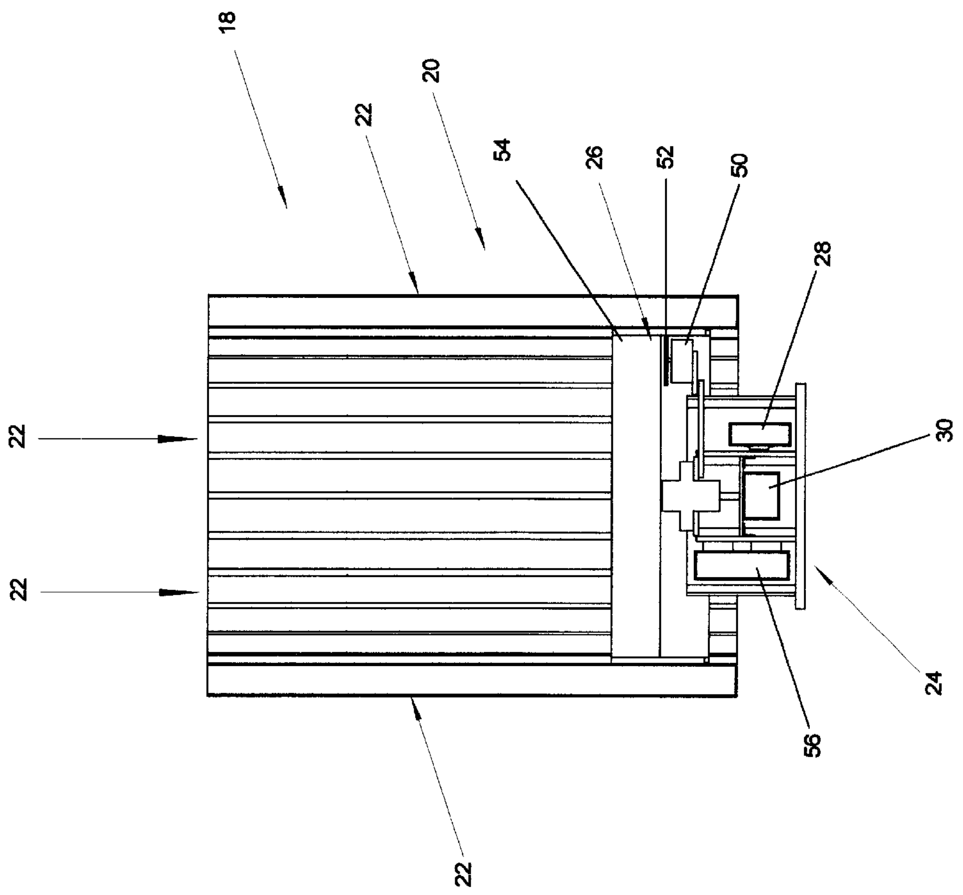
FIG. 4 is a cross-sectional front view of the product dispensing system of the present invention.

As shown in FIG. 4, the carousel drive 26 comprises a motor 50 and a drive wheel 52 disposed to engage a drum 54 configured to support each product compartment 22.

The carousel drive 26 and the carousel position sensor or indicator 30 comprise a carousel positioning device. The motor 50, the module controller 28, scanners 46 and 34, and electromechanical devices are coupled to a power supply 56 to provide power from a power source (not shown) to provide energy or power the various electromechanical devices, scanner/detectors and control logic.

Figure 6:
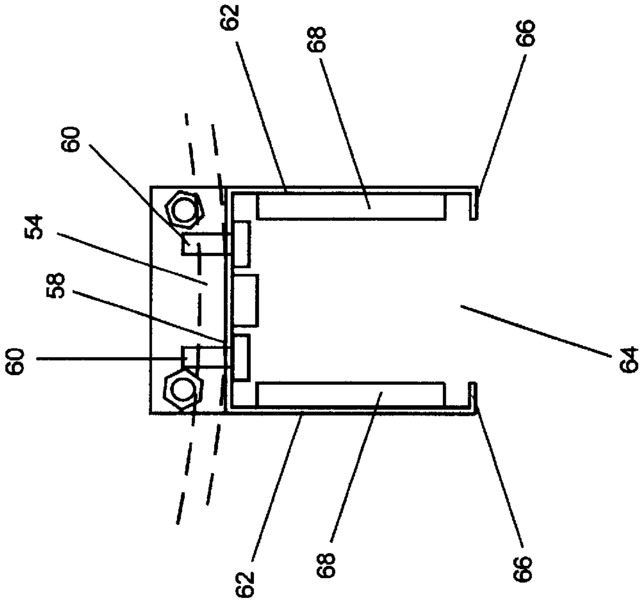
FIG. 6 is a top view of the product compartment of the present invention.
Figure 7:
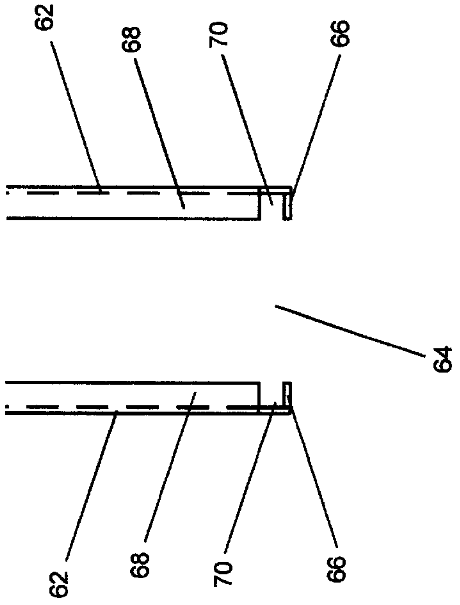
FIG. 7 is a front view of the product compartment of the present invention.

As best shown in FIGS. 6 and 7, each product or article storage compartment 22 comprises a rear substantially vertical wall 58 coupled to the drum 54 by at least one fastener 60, a pair of substantially parallel, substantially vertical side walls each indicated as 62 that cooperatively form a substantially U-shaped product or article channel 64, a substantially vertical front retention flange 66 on the outer end portion of each substantially vertical side wall 62 extending across at least a portion of the substantially U-shaped product or article channel 64 to retain product within the substantially U-shaped product or article channel 64, a substantially horizontal lower product or article support 68 extending inwardly from the lower portion of each substantially vertical side wall 62 to support a stack of product within the substantially U-shaped product or article channel 64 and a product dispensing slot 70 formed between the lower portion of the front retention flange 66 and corresponding substantially horizontal lower product or article support 68 to selectively dispense product from the substantially U-shaped product or article channel 64 through the product dispensing slot 70.

Figure 3:
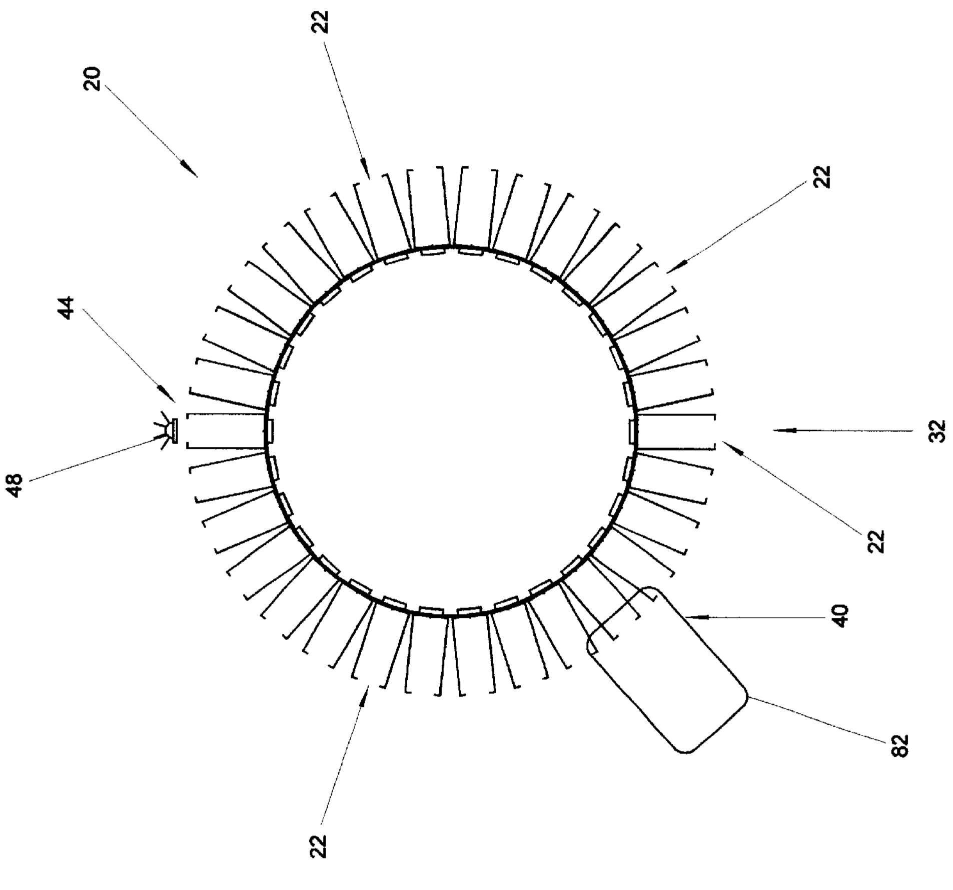
FIG. 3 is a schematic top view of the product dispensing system of the present invention.
Figure 5:
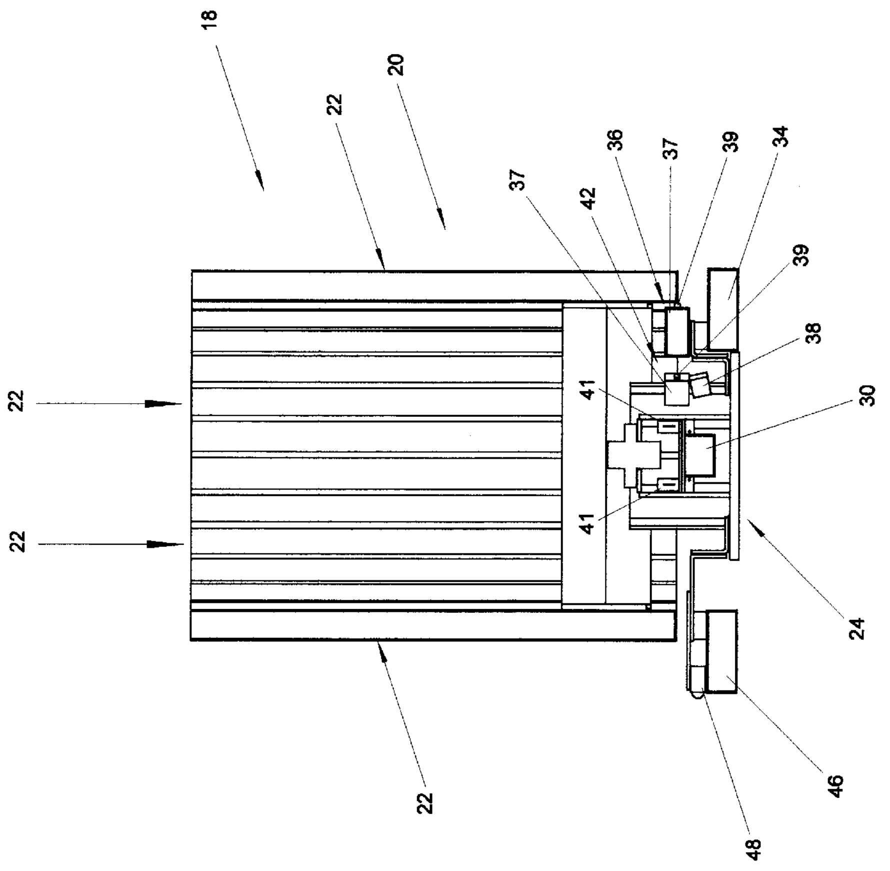
FIG. 5 is a cross-sectional side view of the product dispensing system of the present invention.

Rather than being attached to the drum 54 as shown in FIG. 6, the product compartment 22 may be clipped to the drum 54 as shown in FIGS. 3 through 5.

As best shown in FIG. 2, the tray/tote transport system 12 may comprise a conveyor 72 or other similar tray/tote positioning device that facilitates the movement of trays/totes 14 from a tray/tote supply station 74 to a tray/tote take-off or fulfillment station 76 disposed at opposite ends of the product dispensing system 10. The tray/totes 14 may be manually placed on and removed from the conveyor 70 or the process may be mechanized with the use of state of the art handling equipment.

The control system 16 comprises a product request system or order distribution computer 78 to order a discrete inventory of products associated with a specific identifiable request, a transport/request control system or tote identification scanner 80 to identify and supply discrete trays or totes 14 to the dispensing system 10 to fill the particular tray or tote 14 with the corresponding requested inventory of products and the module controller 28 to control the operation of the product dispensing system 10 in filling the designated tray or tote 14 with the discrete inventory of products associated therewith.

The product request system or order distribution computer 78 includes a product input such as a keyboard to prepare and input a regimen of articles or products to be dispensed to a corresponding tray/tote 14. In addition, a remote host computer or dispensing system control 82 may be used to input the regimen of articles or products.

Figure 8:
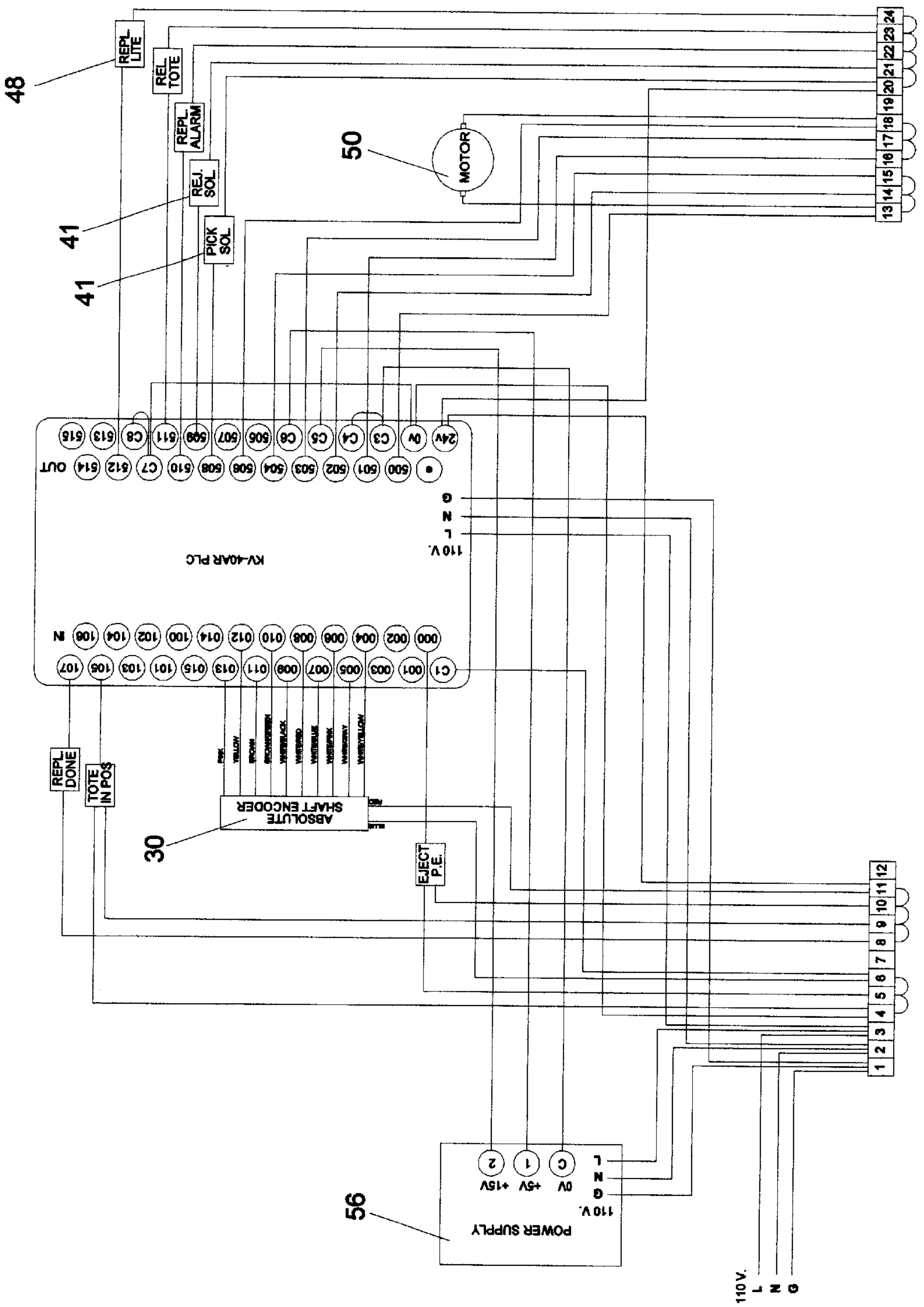
FIG. 8 is a functional electronic diagram of the product dispensing system of the present invention.

Reference to FIG. 8 depicting the operatively relationships between system components and mechanisms will assist in understanding of the operation of the apparatus, the article dispensing system and the product request system 78.

When operating in the dispensing mode, a tray/tote 14 is transported from the tray/tote loading station 74 to the dispensing station 32 as the carousel 20 rotates the appropriate product stack in the corresponding product compartment 22 to the dispensing station 32 by the carousel positioning device. The tray/tote 14 is scanned by transport/request control system or tote identification scanner 80 to signal the product request system or order distribution computer 78 which particular product or article is to be dispensed When both the tote 14 and the stack are in position, the product is scanned by the product detector 34 and when confirmed or verified as the correct or proper product by the control system 16, the product is dispensed into the tray/tote 14 by the product ejector 36. The scanning and dispensing continues until all of the requested products are dispensed into the tray/tote 14.

As product is dispensed from the bottom of the product or article channel 64, the product dispensed sensing device 38 or beam of the photo eye is blocked. Once the product clears the carousel 20, the product drops into the tray/tote 14 clearing the beam of the photo eye, the dispensing process continues. If the photo eye is not blocked during the dispensing cycle, the system generates as signal to indicated that the product or article channel 64 is empty. On the other hand, if the photo eye is blocked but does not clear, the system generates a signal to indicate that the product or article has not cleared the product or article channel 64 and is jammed.

If the product detector detects 34 an incorrect product in the product stack or compartment 22, the system control will rotate the product compartment 22 containing the incorrect product to the rejecting station 40 where the product rejector 42 rejects the product into a bin 82 and then returns to the appropriate product compartment 22 with the correct stack of product to the dispensing station 32 to complete the filling process.

If an empty product compartment 22 is detected while in the dispensing mode, the product dispensing system will alert the operator who will prioritize the restocking of the correct product in the appropriate product compartment 22.

A tray/tote reject spur may be located adjacent the fulfillment or tray/tote unloading station 76. The product dispensing system 10 will divert any trays/totes 14 containing incomplete orders monitored by the product request system 78 including logic to compare the ordered products to the products actually dispensed to the tray/tote reject spur and print a list of missing products to be supplied or completed by the system operator to fill the request.

When in the stocking or restocking mode, the operator will position product to at the stocking/restocking 44. The operator will position product, and if the product is located within a product compartment 22 on the carousel 20, the appropriate product compartment 22 for that product will be rotated to the stocking/restocking station 44 by the system control 78. Once the proper product compartment 22 is so positioned, the stock/restock light or other indicator 48 will be energized; the operator will place the product in the product compartment 22. Once the product is stocked or restocked, the operator will depress the "replenishment done" push button 48 completing the process. Upon completion of the stocking of the product stack, the product dispensing system returns automatically to the dispensing mode.

If the product selected to be stocked or restocked does not have a corresponding product compartment 22 on the carousel 20, the indicator or lamp 48 will provide an alternate signal.

The invention accordingly comprises the features of construction, combination of elements, and arrangement of parts that will be exemplified in the construction hereinafter set forth, and the scope of the invention will be indicated in the claims.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. An article dispensing system operable in a dispensing mode or a stocking mode to dispense products selected from a plurality of products comprising a dispensing module including a carousel having a plurality of product compartments to store the plurality of products therein selectively rotatable between a dispensing station, a rejecting station and a stocking station by a carousel positioning device having a carousel position detector to determine the rotational position of the carousel relative to the dispensing station, the rejecting station or the stocking station and a drive motor to selectively position the carousel relative to the dispensing station, the rejecting station or the stocking station, a product detector to selectively detect the product at the dispensing station, and a product ejector to selectively eject product at the dispensing station and a product rejector to selectively eject product at the rejecting station, and a system control including a product input to select product to be dispensed from the article dispensing system operatively coupled to said carousel positioning device and said carousel position detector, said product detector, said product ejector and said product rejector such that when the article dispensing system is operating in the dispensing mode said carousel position device rotates the product compartment designated to contain the selected product to the dispensing station and said product ejector ejects the selected product from said product compartment when the selected product at the dispensing station is detected and rotates said product compartment designated to contain the selected product from the dispensing station to the rejecting station and said product rejector ejects the product at the rejecting station when product other than the selected product is detected by said product detector at the dispensing station and rotates said product compartment designated to contain the selected product from the dispensing station to the stocking station to allow restocking of the selected product to be stored in designated product compartment when the designated product compartment is detected by said product detector at the dispensing station when operating in the stocking mode.

2. The article dispensing system of claim 1 wherein each said product compartment comprises a rear wall and a pair of side walls that cooperatively form a substantially U-shaped product channel, a front retention flange on the outer end portion of each said side wall extending across at least a portion of said substantially U-shaped product channel to retain product within said substantially U-shaped product channel, a lower product support extending inwardly from the lower portion of each said side wall to support a stack of product within said substantially U-shaped product channel and a product dispensing slot formed between the lower portion of said front retention flange and corresponding lower product support to selectively dispense product from said substantially U-shaped product channel through said product dispensing slot.

3. The article dispensing system of claim 1 wherein each said product compartment comprises a product channel having a retention flange formed on each side thereof to retain product therein and a lower product support to support a stack of product within said product channel and a product dispensing slot formed the front thereof to selectively dispense product.

4. The article dispensing system of claim 1 further comprises a product dispensed sensing device including means to sense the dispensing of a selected product from said product compartment at the dispensing station to generate a dispensed signal fed to said system control to indicate the selected product had been dispensed.

5. The article dispensing system of claim 4 wherein said product dispensed sensing device including means to sense no product was dispensed from said product compartment at the dispensing station to generate a nondispensed signal fed to said system control to indicate the selected product has not dispensed.

6. The article dispensing system of claim 5 wherein said product dispensed sensing device includes means to sense that a product was partially dispensed from said product compartment at the dispensing station and to generate a jammed signal fed to said system control to indicate the selected product was partially dispensed causing a jam.

7. An article dispensing system to selectively dispense products comprising a dispensing module including a carousel to store the plurality of products rotatable by a carousel positioning device between a dispensing station and a rejecting station to selectively position the carousel relative to the dispensing station or the rejecting station, a product ejector to selectively eject product at the dispensing station and a product rejector to selectively eject product at the rejecting station, a product detector to verify the product at the dispensing station is the selected product and a control system including a product input to select the product to be dispensed from said article dispensing system operatively coupled to said carousel positioning device, said product ejector and said product rejector such that said carousel positioning device rotates said product compartment designated to contain the selected product to the dispensing station and said product ejector ejects the selected product from said product compartment when the selected product is verified and said carousel positioning device rotates said product compartment designated to contain the selected product from the dispensing station to the rejecting station when product other than the selected product is detected by said product detector at the dispensing station and said product rejector ejects product at the rejecting station.

8. The article dispensing system of claim 7 wherein each said product compartment comprises a rear wall and a pair of side walls that cooperatively form a substantially U-shaped product channel, a front retention flange on the outer end portion of each said side wall extending across at least a portion of said substantially U-shaped product channel to retain product within said substantially U-shaped product channel, a lower product support extending inwardly from the lower portion of each said side wall to support a stack of product within said substantially U-shaped product channel and a product dispensing slot formed between the lower portion of said front retention flange and corresponding lower product support to selectively dispense product from said substantially U-shaped product channel through said product dispensing slot.

9. The article dispensing system of claim 7 wherein each said product compartment comprises a product channel having a retention flange formed on each side thereof to retain product therein and a lower product support to support a stack of product within said product channel and a product dispensing slot formed the front thereof to selectively dispense product.

10. The article dispensing system of claim 7 wherein said carousel positioning device comprises a carousel drive to rotate said carousel and a carousel position indicator including logic to generate a feedback signal fed to said system control to indicate the position of said carousel relative to the dispensing station and the rejecting station.

11. The article dispensing system of claim 10 wherein said carousel drive comprises a drive member disposed to engage the interior of said carousel and a motor to selectively drive said drive member.

12. The article dispensing system of claim 7 further comprises a product dispensed sensing device including means to sense the dispensing of a selected product from said product compartment at the dispensing station to generate a dispensed signal fed to said system control to indicate the selected product had been dispensed.

13. The article dispensing system of claim 12 wherein said product dispensed sensing device including means to sense no product was dispensed from said product compartment at the dispensing station to generate a nondispensed signal fed to said system control to indicate the selected product has not dispensed.

14. The article dispensing system of claim 13 wherein said product dispensed sensing device includes means to sense that a product was partially dispensed from said product compartment at the dispensing station and to generate a jammed signal fed to said system control to indicate the selected product was partially dispensed causing a jam.

15. An article or product dispensing system a to dispense products selected from a plurality of products comprising a dispensing module including a carousel to store the plurality of products selectively rotatable by a carousel positioning device between a dispensing station and a rejecting station to selectively position the carousel relative thereto, a product ejector to selectively eject product at the dispensing station and a product rejector to selectively eject product at the rejecting station, a product detector to verify the product at the dispensing station is the selected product and a control system including a product input to select the product to be dispensed operatively coupled to said carousel positioning device, said product ejector and said product rejector such that said carousel positioning device rotates said carousel to position the selected product at the dispensing station and said product ejector ejects the selected product when the product is detected and said carousel positioning device rotates said carousel to position the product at the rejecting station when product other than the selected product is detected at the dispensing station and said product rejector ejects product at the rejecting station.

16. The article dispensing system of claim 15 wherein each said product compartment comprises a rear wall and a pair of side walls that cooperatively form a substantially U-shaped product channel, a front retention flange on the outer end portion of each said side wall extending across at least a portion of said substantially U-shaped product channel to retain product within said substantially U-shaped product channel, a lower product support extending inwardly from the lower portion of each said side wall to support a stack of product within said substantially U-shaped product channel and a product dispensing slot formed between the lower portion of said front retention flange and corresponding lower product support to selectively dispense product from said substantially U-shaped product channel through said product dispensing slot.

17. The article dispensing system of claim 15 wherein said carousel positioning device comprises a carousel drive to rotate said carousel and a carousel position indicator including logic to generate a feedback signal fed to said system control to indicate the position of said carousel relative to the dispensing station and the rejecting station.

18. The article dispensing system of claim 17 wherein said carousel drive comprises a drive member disposed to engage the interior of said carousel and a motor to selectively drive said drive member.

19. The article dispensing system of claim 15 further comprises a product dispensed sensing device including means to sense the dispensing of a selected product from said product compartment at the dispensing station to generate a dispensed signal fed to said system control to indicate the selected product had been dispensed.

20. The article dispensing system of claim 19 wherein each said product compartment comprises a product channel having a retention flange formed on each side thereof to retain product therein and a lower product support to support a stack of product within said product channel and a product dispensing slot formed the front thereof to selectively dispense product.

21. The article dispensing system of claim 19 wherein said product dispensed sensing device including means to sense no product was dispensed from said product compartment at the dispensing station to generate a nondispensed signal fed to said system control to indicate the selected product has not dispensed.

22. The article dispensing system of claim 21 wherein said product dispensed sensing device includes means to sense that a product was partially dispensed from said product compartment at the dispensing station and to generate a jammed signal fed to said system control to indicate the selected product was partially dispensed causing a jam.

* * * * *